United States Patent

Rampel

[15] 3,660,170
[45] May 2, 1972

[54] DENDRITE-INHIBITING ADDITIVE FOR BATTERY CELL HAVING ZINC ELECTRODE

[72] Inventor: Guy Rampel, Gainesville, Fla.
[73] Assignee: General Electric Company
[22] Filed: Apr. 8, 1970
[21] Appl. No.: 26,607

[52] U.S. Cl. .................................................136/154, 136/6
[51] Int. Cl. .......................................................H01m 43/06
[58] Field of Search ........................136/30, 154, 6; 204/55; 260/89.7 N, 88.3 R

[56] References Cited

UNITED STATES PATENTS

| | | | |
|---|---|---|---|
| 2,692,904 | 10/1954 | Strauss | 136/30 |
| 3,160,526 | 12/1964 | Ruetschi | 136/154 |
| 3,288,770 | 11/1966 | Butler | 260/89.7 N |
| 3,515,707 | 6/1970 | Reimschuessel et al. | 260/89.7 N |

Primary Examiner—Donald L. Walton
Attorney—Nathan J. Cornfeld, Frank L. Neuhauser, Oscar B. Waddell, Joseph B. Forman and John P. Taylor

[57] ABSTRACT

To inhibit the formation of overgrowth of excessive dendritic zinc, for example during recharging of a rechargeable electrolytic battery cell, or in electroplating, the electrolyte contains an additive consisting essentially of a cationic high molecular weight organic linear polymer which has a positive ion radical of substituted ammonium which may be one of a large number of related ammonium polymers, preferably quaternary. The quaternary nitrogen in the molecule can be part of a ring which may include the adjacent carbon atom for any two of the nitrogen's four substituent radicals, and the ring may also include ether linkages. The polymer compound is water soluble and is soluble in the electrolyte of the cell to the extent required to be effective for proper charge and discharge operation of the cell. The additive may be dissolved in the electrolyte directly, or may be added as a coating on the separator film, or be an ingredient of the paste-type anode. A preferred embodiment of the invention comprises, as the additive, diallyldimethylammonium hydroxide polymer.

12 Claims, 2 Drawing Figures

PATENTED MAY 2 1972 3,660,170

PRIOR ART

INVENTOR
GUY RAMPEL
BY
ATTORNEY

DENDRITE-INHIBITING ADDITIVE FOR BATTERY CELL HAVING ZINC ELECTRODE

BACKGROUND OF THE INVENTION

This invention relates to secondary, rechargeable electrolytic battery cells wherein one of the electrodes, usually the anode, is a porous plate containing zinc, and more particularly to a chemical additive which, when dissolved in the electrolyte, inhibits deleterious dendrite overgrowth formation of the zinc during recharging.

Due to its relatively low price and good electrochemical properties, zinc has long been a desirable ingredient for the negative electrode or anode in rechargeable electrochemical cells, particularly in cells employing alkaline electrolytes. However, one of the major problems relative to zinc-containing anodes has been the relatively short life of such cells due to the formation of harmfully excessive zinc dendrites during the charge portion of the cycle which tend to cause shorting.

Rechargeable alkaline-zinc cells are useful for a variety of applications, to provide electrical energy upon discharge of the cell. Such cells are further desirable in that cells are rechargeable after discharge. Such cells include, for example, silver-zinc, nickel-zinc, mercury-zinc, magnesium-zinc, manganese dioxide-zinc, zinc-oxygen and zinc-air cells.

Presently, a major problem in a rechargeable alkaline-zinc cell is the extended formation of deleterious zinc dendrite overgrowth during the recharging cycle which short out and thereby destroy the cell. These dendrites are formed from the reduction of soluble potassium zincate which is present in the alkaline electrolyte when the zinc electrode has been discharged previously.

The above problem of zinc dendrite shorting in rechargeable alkaline cells is discussed in detail in an article entitled "A New Nickel-Zinc Accumulator" by N. A. Zhulidov and E. I. Efremov, published in U.S.S.R., Vest. Elektroprom., 1963, 34, No. 2, Feb. pp. 74–75. This article describes a nickel-zinc battery wherein the negative electrode is made from a mixture of zinc and hydroxide components.

The formation of dendritic zinc occurs when zinc metal becomes deposited out onto the anode during the charging operation as a result of the reduction to metallic metal of the zinc ions present in the highly soluble potassium zincate in the alkaline electrolyte. A high current density occurs at the edges of the electrode and along the boundaries thereof. This concentration causes metallic zinc crystals to initiate, forming as outwardly-pointed dendrites and accumulating at these locations. These zinc metal dendrites, forming as an overgrowth on the normal initial zinc deposit on the negative electrode (anode) during charge, tend to rapidly span the narrow gap between the positive and negative electrode plates and short circuit the cell by forming a current-conducting bridge, not only at the edges of the electrode, but also where their pointed ends penetrate through the porous membranes and separators located between the positive and negative electrodes, thus causing short circuiting of the cells after only a very few discharge and recharge cycles.

Prior attempts to solve this problem have been directed primarily to providing physical barriers to the dendrite penetration, such as extra layers of separator material, or to the use of a membrane which resists zinc dendrites and having a cationic ion-exchange polyethylene base, as described in U. S. Pat. No. 3,427,206, issued Feb. 11, 1969. Chemical additives such as lead compounds have been employed as additives to the electrolyte in an attempt to inhibit zinc dendrite formation, but these have retarded formation of short-circuiting zinc dendrites for only a few cycles at best, and have not effectively solved the problem.

It is therefore a primary object of this invention to provide means for chemically inhibiting the formation of dendritic zinc during the charging of rechargeable electrolytic battery cells wherein one of the cell electrodes contains zinc.

Another object of the invention is to provide a chemical additive for zinc-containing liquids which will inhibit zinc crystals from forming as overgrowth dendrites when metallic zinc is electrodeposited out therefrom and to promote instead electrolytic plating out of discrete metallic particles without conglomeration or deleterious crystalline dendritic formation.

Still another object of the invention is to provide a novel battery cell structure wherein the paste type electrode contains as an ingredient thereof a material which can dissolve in the electrolyte to inhibit deleterious zinc dendrite overgrowth formation during the charging portion of the cycle.

A still further object of the invention is to provide a novel battery cell structure wherein the membrane separator between the positive and negative electrodes of the battery cell contains a coating material which can dissolve in the electrolyte to inhibit deleterious zinc dendrite overgrowth formation during the charging portion of the cycle.

Another and important object of the invention is to provide a stable chemical dendrite overgrowth inhibiting additive having a high molecular weight which, when dissolved in a liquid medium (such as in electroplating as well as in battery electrolytes) containing zinc ions, forms positive ions of a substituted ammonium polymer which tends to maintain its high molecular weight and thus to remain effective and to migrate under the influence of electric current in the same direction as zinc ions toward the negative electrode so as to promote smooth and non-dendritic electrodeposition of zinc metal onto the electrode; the additive maintaining its activity over many repeated current reversals.

SUMMARY OF THE INVENTION

These and other objects of the invention are achieved, according to a preferred form of the invention, by providing a high molecular weight organic linear polymer of substituted ammonium having a monovalent positive ion with the general formula:

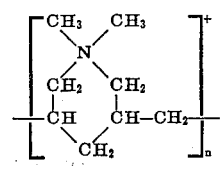

with a negative ion associated therewith, which is a non-hydrocarbon anion, such as a hydroxyl group, a halogen, sulfate or acetate.

The chemical dendrite-inhibiting polymer additive may be dissolved directly in the alkaline (or acid) electrolyte of the cell; or alternatively it may be applied as a coating (sprayed or dipped) onto the membrane film between the positive and negative electrodes; or the additive may be used as a binder ingredient in the paste composition of the zinc-containing electrode.

The preferred form of the chemical additive of the present invention is the hydroxide form of a cationic water-soluble polymer prepared from diallyldimethylammonium chloride polymer. U. S. Pat. No. 3,288,770 of George B. Butler, issued Nov. 29, 1969, discloses a class of water-soluble quaternary ammonium polymers useful as a synthetic organic flocculant in the treatment of potable water, also discussed in Chemical and Engineering News, Jan. 15, 1968, pp. 46–47. The chloride homopolymer of this class is available commercially as a dilute aqueous solution from Calgon Company under the trademark "Cat-Floc." I have found that when this water-soluble chloride polymer is treated to convert it to the hydroxide, the resulting product is useful in zinc-containing electrolytic solutions, such as battery cells and electroplating, to achieve the aims of this invention so as to inhibit the formation of deleterious dendrites of electrodeposited zinc, when used in accordance with the teachings herein. As more fully described in the above-mentioned article in Chemical and Engineering News, the chloride polymer is typically prepared by mixing a water solution of a suitable monomer with a catalytic amount of butylhydroperoxide. The reaction vessel is purged with nitrogen and the mixture is kept at 50° to 75° C for 48 hours to form the chloride product.

A large number of related quaternary ammonium polymers can be made similarly to those of the diallydimethylammonium dimethylammonium polymers. The key to the family of these cationic polymers is that the monomer from which they are prepared has two olefin sites separated by three chain atoms, one of which is a nitrogen atom from a quaternary ammonium chloride group. The nonallylic substituents on the quaternary nitrogen can be part of a ring which may include the adjacent carbon atom for any two of the nitrogen's four substituent radicals. The ring may also include ether linkages.

In accordance with my invention, a converted form of the cationic organic polymer, with a negative ion compatible with the solution to which it is added, is dissolved in an electrolytic solution containing zinc, in an amount of approximately 0.1 to 2.5 percent weight per cent, and the presence of the positive ions of the polymer functions to inhibit the electrodeposition of dendritic zinc crystals beyond the separator membrane. The electrolytic zinc-containing solution may be the electrolyte in an alkaline-zinc cell, or may be the electrolytic solution in electroplating of zinc. The polymer additive may be dissolved directly in the zinc-containing solution, or may be present in contact with the solution as a binder ingredient in a paste-type zinc-containing electrode; or the polymer may be present as a coating on the separator film of a battery cell so that it can enter into solution into the zinc-containing liquid from such electrode, or from such separator-film coating, or both.

The foregoing and various other objects, features and advantages of the invention will be better understood from the following description taken in connection with the accompanying drawings, in which:

BRIEF DESCRIPTION OF THE DRAWINGS

As shown in FIG. 1 of the drawing, the prior art type of rechargeable cell commonly had a negative zinc-containing electrode 10 and a positive electrode 12 both in contact with an alkaline liquid electrolyte 14. Difficulties resulting in short life of the cell occurred due to the formation, during the recharge portion of the cycle, of individual needle-like and conglomerate crystalline overgrowth zinc dendrites, for example at 16 on the zinc-containing electrode 10, and particularly at the edges 18 of the electrode 10 where there was a high current density. A basic normal initial deposit 15 of zinc occurs at the face of electrode 10, and is primarily of mossy crystalline formation. The deleterious dendritic crystal overgrowth at 16 and 18 soon penetrate the porous permeable membrane 17 and contact the positive electrode 12, shorting out the cell.

In FIG. 2 of the drawing, there is illustrated a schematic representation of a zinc-containing electrolytic solution 24, forming part of a flooded type of rechargeable alkaline-zinc cell generally designated by the numeral 20. The cell comprises a casing 21, which may contain a top closure (not shown) equipped with a customary vent. A negative zinc-containing electrode 30 and a positive electrode 32 are immersed in the electrolyte 24. The positive electrode 22 may be of the usual materials such as Nickel, Silver, Mercury, Magnesium, Manganese dioxide, oxygen or air.

Figure 1:
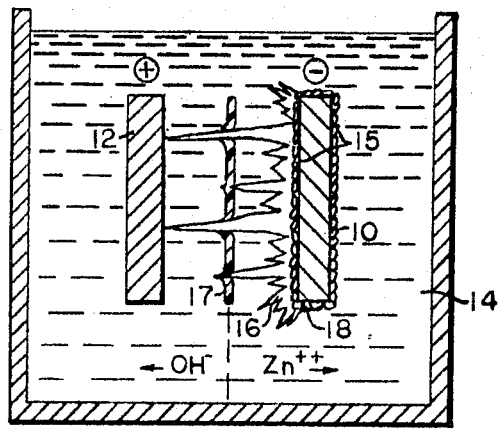
FIG. 1 is a schematic view of a prior art flooded type of rechargeable alkaline-zinc battery cell.
Figure 2:
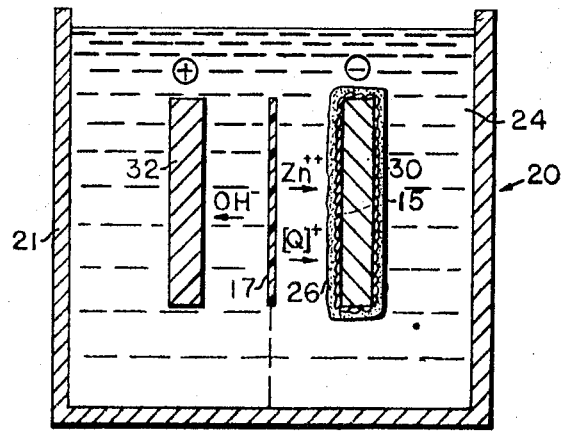
FIG. 2 is a schematic view of a flooded type of rechargeable alkaline zinc battery cell to illustrate the function of the chemical additive of my invention.

During the charging operation, negative OH ions migrate, as usual, toward the positive electrode 32. However, the electrolyte 24 now contains the high molecular weight organic cationic polymer additive, whose positive monovalent ions are schematically designated in FIG. 1 by the symbol $[Q]^+$. Under the influence of the charging current, the $Zn^{++}$ ions and the $[Q]^+$ ions both migrate simultaneously in the same direction toward the electrode 30 together against and in the vicinity of electrode 30, forming a deposit on that electrode at 26, with the organic polymer additive admixing with and forming with the deposited metallic zinc discrete metal-containing particles, without conglomeration or separator-penetrating crystalline dendritic formation. Thus the deposited zinc morphology has been changed due to the presence of the organic dentrite-inhibiting polymer. Furthermore, the $[Q]^+$ ions which are not deposited out onto the electrode 30 with the zinc tend to remain in the vicinity of that electrode and in its compartment because of their high molecular weight, which contributes to their tendency not to diffuse rapidly throughout the electrolytic solution 24.

My invention will be more fully appreciated by reference to the following examples:

EXAMPLE I

Preparation of Hydroxide Form of Quaternary Ammonium Polymer

To 100 grams of the 15 percent water solution of poly-diallyldimethyl-ammonium chloride polymer (sold commercially under the trademark "Cat-Floc" by Calgon) was added 8.0 grams of potassium acetate, and the mixture stirred until the acetate was dissolved. Five grams of potassium hydroxide (KOH) in water solution was then stirred in to cause the quaternary hydroxide form of the polymer to precipitate out as a yellow viscous material. After decanting the remaining liquid, the polymer hydroxide precipitate was redissolved in water and reprecipitated with concentrated KOH to purify it, and this latter procedure was repeated until the remaining product was completely free of chloride and acetate. The solution of the polymer hydroxide in KOH was used in Examples III and V; and another portion thereof was dried under vacuum in an oven to evaporate the moisture and was stored as the dry polymer hydroxide for use later in Examples II, Iv and VI.

EXAMPLE II

A 28 Ampere-Hour Nickel-Zinc battery cell containing a total of 160 grams of zinc in the electrodes was filled with 20 percent potassium hydroxide electrolyte containing 2.0 percent of the quaternary ammonium polymer hydroxide from Example I as aqueous KOH solution, based on the weight of zinc present. The zinc-containing electrodes of the cell were of the known pasted type having a copper expanded metal current collector, which after drying were assembled into a battery cell with alternate positive nickel electrodes and separated by a non-woven nylon separator and wrapped in an ionically permeable polyethylene membrane. The positive and negative electrodes were attached to suitable electrical terminals and the entire stack placed in a container and subjected to recharging current. The cells were then cycled electrically to 100 percent depth of charge and discharge, based on the nickel electrode capacity, at room temperature during a 24 hour period. The treated cells containing the polymer hydroxide additive were all capable of being so cycled and overcharged up to 100 percent capacity as many as 200 cycles satisfactorily without shorting, whereas control cells subjected to the same regime, but without containing the addition of the polymer hydroxide addition failed at up to 25 cycles due to dendritic shorting.

EXAMPLE III

Five per cent of poly-diallyldimethylammonium hydroxide, based on the weight of zinc in the electrode and added as the 30 percent KOH solution prepared in accordance with Example I, was incorporated as a binder into a pasted type zinc-amalgam electrode containing 1,600 grams powdered zinc, 122 ml. polytetrafluoroethylene (PTFE) and 32 grams of mercuric oxide. The ingredients were made into a paste and spread onto a rectangular expanded copper current collector, which was then allowed to dry at room temperature and subjected to pressing to form an electrode having an average thickness of 60 mils. A conventional nickel counter electrode was employed having the same geometric dimensions as the zinc-containing electrode. The nickel electrode was formed of a nickel plaque impregnated with nickel hydroxide. Both the nickel and zinc electrodes were placed in non-woven nylon bags, with separators of methylacrylic polyethylene and assembled into 120 ampere-hour cells. For comparison purposes, as control cells, similar cells were made, but with the zinc-containing electrodes of the control cells having no poly-diallyldimethylammonium hydroxide polymer therein. The cells were filled with 20 percent potassium hydroxide electrolyte, but with no polymer additive in the electrolyte, since it had been added as an ingredient to the pasted electrode. The cells and control cells were cycled electrically up to 100 percent depth of charge and discharge, based on the nickel electrode capacity, at room temperature during a 24 hour period. The cells having zinc-containing pasted electrodes which include the polymer hydroxide as an ingredient all proved capable of being so cycled and overcharged up to 100 percent capacity as many as 200 cycles satisfactorily without shorting, whereas the control cells not containing the polymer hydroxide failed at up to 25 cycles due to dendritic shorting.

EXAMPLE IV

Two sets of 28 ampere-hour cells were prepared, with electrodes similar to those of Example III but of correspondingly smaller area. Some of these were filled with 20 percent concentration potassium hydroxide electrolyte, and some were filled with 34 percent concentration potassium hydroxide electrolyte. All cells were then cycled electrically to 100 percent depth of charge and discharge, based on the nickel electrode capacity, at room temperature during a 24 hour period. The cells containing 20 percent KOH electrolyte with electrodes containing 5 percent polymer additive had a cycle life in excess of 130 cycles, whereas those containing 34 percent KOH, 21 cycles were completed prior to shorting.

EXAMPLE V

Cells similar to those of the control cells of Example III were prepared, except that a coating of the polymer hydroxide of Example I was applied to the polyethylene separator by dipping the separator into a concentrated water solution of the polymer hydroxide, and dried. The quantity of polymer hydroxide applied was about 2.0 percent, based on the weight of zinc present in the electrode. No polymer hydroxide was added to the pasted electrodes and none was added to the electrolyte solution. Nevertheless, apparently due to dissolving or migration of the polymer from the coating on the separator into the electrolyte solution, the treated cells containing the coated separator films were all capable of being cycled and overcharged in a manner similar to those cycles used in Examples II and III as many as 200 cycles satisfactorily without shorting, whereas the control cells had failed at up to 25 cycles due to dendritic shorting.

EXAMPLE VI

To a zinc electroplating 5 percent acetic acid solution containing 10 percent of zinc acetate and opposed positive zinc and negative copper electrodes immersed therein, there was added 2.0 percent by weight, based on the amount of zinc present, of dry poly-diallyldimethylammonium hydroxide from Example I. The zinc plating, carried out at 200 milliamps per sq. cm. until a substantial desired thickness of plating resulted in a smooth electrodeposition of a metallic coating, of zinc, with no mossy or tree-like deposits.

I have found that the dendrite problem and its elimination by the chemical inhibiting additives of the present invention are related to cell size because of the corresponding areas of electrodes used, the problem becoming critical for battery sizes of 28 ampere-hours and greater. The results of the above examples indicate that for the polymer additive to be effective, it must become dissolved in the zinc-containing liquid, such as the electrolyte.

It should be understood that the poly-diallyldimethylammonium hydroxide polymer described is the preferred composition for the described exemplary embodiments of the invention, but the invention is by no means strictly limited thereto; and furthermore, the invention is broader than the foregoing examples. As to the family of substituted ammonium polymers which are effective as zinc dendrite-inhibiting chemicals, it should be recognized that the above-discussed quaternary substituents can break down under certain conditions into tertiary, secondary and primary substituted ammonium polymers, which will be effective for the intended dendrite-inhibiting purposes provided they have the high molecular weight monovalent cation which migrates electrophoretically with zinc ions toward and onto the negative electrode. Since the nitrogen can be trivalent or pentavalent, by degradation or otherwise, a number of effective polymers can thus result.

As used herein, the expression "Polymeric cation" or the symbol $[Q]^+$ is used to represent a monovalent cationic substituted ammonium group having essentially a linear homopolymeric molecular chain of repeating units of a formula selected from one of the following:

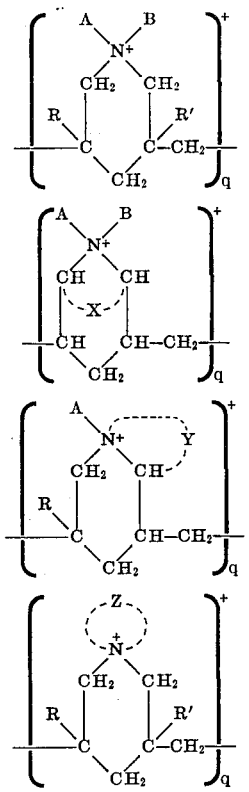

wherein the symbol $q$ is an integer representing the number of units in the molecular chain.

It will be appreciated that, with each such cationic ammonium group, there is associated an anion, preferably a hydroxyl $OH^-$ group, but which anion may also be a halogen (chloride, bromide, fluoride, and iodide), an acetate, or sulfate.

In the above formulae, the symbols A and B independently represent hydrogen, or an alkyl, hydroxyalkyl, or phenyl radical which may contain as substituents such groupings as amido, carbo-loweralkoxy, mono-. and di-cyclic aryloxy, cyano, thio-loweralkoxy, thiophenoxy, or lower alkoyl (forming a ketonic group) radicals, 5- and 6- membered cycloalkyl groupings, and, on the alkyl groupings only, a nitro group, and on the phenyl radical only, a halogen atom (chlorine, bromine, fluorine or iodine). "A and B, taken together, represent a member selected from the group consisting of:

$$-CH_2-CH_2-, -CH(CH_3)-CH(CH_3)---CH=$$
$$CH-CH \quad CH-, -CH=CH-CH=N-$$
and
$$-CH=CH-N=CH-$$

The symbols R and R' independently represent a hydrogen, chloro, bromo, or lower alkyl or phenyl radical having substituents as stated under the definition for A above.

The symbol X stands for a divalent radical of the formula:
$$-CH_2-(O)_n-(CH_2)_m-$$
The symbol Y stands for a divalent radical of the formula:
$$-(CH_2)_p-(O)_n-CH_2-$$
The symbol Z stands for a divalent radical of the formula:
$$-(CH_2)_p-(O)_n-(CH_2)_2-$$

In the last-mentioned of these formulae, $n$ represents one of the numbers 0 and 1; $m$ represents one of the numbers 1 and 2; and $p$ represents one the numbers 2 and 3.

In the above formulae, the preferred materials are those in which R and R' represent hydrogen, methyl or chloro substituents, and those in which A and B represent methyl radicals, because of the resulting lower equivalent weight of the quaternary ammonium unit. At least one of A or B could be phenyl and the other methyl without sacrifice of cost-efficiency because aniline is inexpensive.

The high molecular weight polymer cations (in excess of one million molecular weight) of the compositions of the present inventions are believed to perform their novel and unique function due to the solubility of the compound, higher molecular weight, and positive charge.

Although the preferred electrolyte given in the battery cell examples has been stated as alkaline potassium hydroxide, the useful range of solubility of the poly-diallyldimethylammonium hydroxide polymer has been found to reach a maximum concentration at about 35 to 40 percent potassium hydroxide. Above this concentration of KOH, the solubility of this polymer hydroxide decreases, and thus its overgrowth dendrite-inhibiting effectiveness. The polymer additive is therefore most effective in solutions up to the limits of its solubility therein. Other derivatives of these classes of diallyl quaternary substituted ammonium polymers and/or slightly lower molecular weights would be expected to exceed these solubility limits and thus be effective for the desired dendrite-inhibiting purposes.

The particular high molecular weight quaternary ammonium polymer compounds described herein are quite stable, whereas those of lower molecular weight tend to diffuse away from the electrode and disintegrate easily, and are therefore not sufficiently stable and do not have the requisite dendrite-inhibiting properties in alkaline electrolytes at the concentrations normally employed. I have found that the additive is most effective when in the zinc-containing liquid within the range of 0.1 percent to the limit of solubility in the specific liquid, which may in some cases be as high as 10 percent of the liquid. It is therefore contemplated that the additive be used in such amount as to give from 0.1 percent to 10 weight per cent, preferably about 2.0 weight per cent of the solution. Concentrations of the polymer in the electrodes are preferably about 2.0 to 5.0 percent weight per cent, based on the quantity of zinc present in the electrode. While higher concentrations than 5.0 percent in the electrode, as a binder, may be employed, since the solubility of the polymer is limited in over 35–40 percent concentration of alkali (KOH) there is no particular increase in dendrite-inhibiting effectiveness to justify percentages in excess of 10 percent of the polymer in the electrode.

As mentioned, with increased concentration of KOH in the solution, the solubility of the polymer additive decreases. Consequently, the concentration of the alkaline electrolyte should preferably be selected to provide a sufficient solubility of the polymer hydroxide. The concentration of the KOH electrolyte solution for alkaline-zinc battery cells according to this invention is therefore preferably maintained at 10 to 40 percent. Of course, any alkali metal hydroxide may be substituted for the potassium hydroxide electrolyte of the example.

The polymer additive of this invention will inhibit the formation of both the mossy type as well as the tree-like type of zinc dendrite overgrowth extending beyond the vicinity of the anode.

Although the particular mechanism of how the additive of the present invention performs is not known, the following theory may explain what causes the new and unexpected phenomenon of zinc dendrite inhibiting action. The organic polymer employed has a very high molecular weight, and in the electrolyte environment produces a relatively large monovalent positively charged cation. This large cation of the polymer is attracted to the negative electrode in the same manner as the positively charged zinc ion, so that the polymer cations and zinc ions concentrate around the negative electrode. Furthermore, the cationic polymer agent has surface-active properties, as well as wetting properties which aid in the dendrite-inhibiting action. The high molecular weight positively charged substituted quaternary ammonium ions migrate toward the zinc-containing electrode, and are intermingled with the zinc ions which become plated out as metallic zinc. The morphology of the deposited zinc metal therefore is influenced by the polymer concentration at the anode. The quaternary polymer ions occur in high concentration at the particular locations (e.g., at the electrode edges where current densities are higher) where they are most needed to accomplish the desired results, with no deleterious dendrite overgrowth. A build-up of high concentration of the polymer ions occurs in the vicinity of the negative electrode (anode) during the plating-out operation. Apparently, no electrolytic reduction of the quaternary ammonium ion takes place as it does when the zinc ion becomes the metal. The high molecular weight stable ion of the polymer merely migrates to the negative zinc anode under the influence of the EMF, but it seems that no electron is taken into the polymer ion, and thus there is no change of form of the molecule of the polymer in repeated charge-discharge cycles. Even when the charge-discharge cycles were repeated in excess of 200 cycles, no zinc dendrite formation was observed, indicating that the polymer tends to remain stable and maintain its dendrite-inhibiting properties over repeated current reversals.

While the other modifications of the compositions, electrodes and cell components, process steps and variations thereof which may be employed within the scope and spirit of the invention have not been specifically described, the invention is intended to include such as may be embraced within the following claims:

What is claimed and desired to be secured by Letters Patent of the United States is:

1. In combination with opposed positive and negative electrodes immersed in an aqueous liquid wherein one of the electrodes contains zinc, an additive zinc dendrite-inhibiting agent in said liquid consisting essentially of an organic cationic polymer having a homopolymeric molecular chain of repeating units which in aqueous solution forms positive ions of a formula selected from the group consisting of:

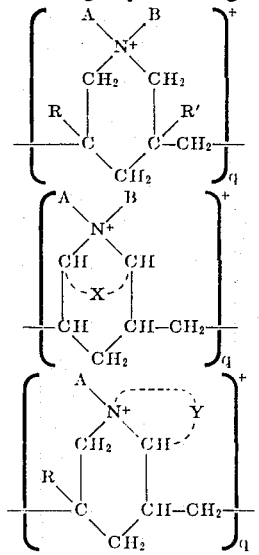

and 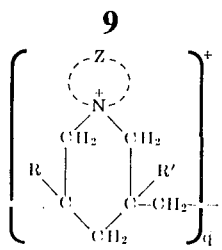

wherein

A and B independently represent a member selected from the class consisting of hydrogen, alkyl and phenyl radicals on which radicals any substituents are selected from the group consisting of hydroxy, amido, carboloweralkoxy, loweralkoxy, phenoxy, napthoxy, cyano, thioloweralkoxy, thiophenoxy, loweralkoyl, 5- and 6- membered cycloalkyl, tri-(loweralkyl) ammoniumloweralkyl, with, on the alkyl groupings only, a nitro group, and, on the phenyl radicals only, a halogen atom; and, taken together, A and B represents a member selected from the group consisting of $-CH_2-CH_2-, -CH(CH_3)-CH(CH_3)-- CH = CH - CH = CH -, -CH = CH - CH = N -$
and
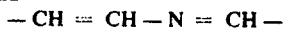
wherein
  R and R' independently represent a member selected from the class consisting of hydrogen, chloro, bromo, loweralkyl, and phenyl radicals;
  X represents a divalent radical of the formula:
    $-CH_2-(O)_n-(CH_2)_m-$
  Y represents a divalent radical of the formula: $-(CH_2)_p-(O)_n-CH_2-$
  Z represents a divalent radical of the formula: $-(CH_2)_p-(O)_n-(CH_2)_2-$
and
  n is one of the numbers 0 and 1;
  m is one of the numbers 1 and 2;
  p is one of the numbers 2 and 3;
and
  q is an integer representing the number of units in the molecular chain.

2. The combination according to claim 1, said positive and negative electrodes and said aqueous liquid together defining a rechargeable battery cell, said negative electrode containing zinc.

3. The combination according to claim 2, said aqueous liquid containing an alkaline electrolyte.

4. The combination according to claim 1, said positive and negative electrodes and said aqueous liquid together defining a zinc electroplating system.

5. The combination according to claim 1, said positive and negative electrodes and said aqueous liquid together defining a rechargeable electrolytic battery cell, said positive electrode comprising a porous plate cathode, said negative electrode comprising a zinc-containing anode, said electrolyte comprising an alkaline metal hydroxide, said dendrite-inhibiting agent being present in said aqueous liquid in an amount from about 0.1 percent to about 10 percent by weight, based on the total weight of zinc in said zinc-containing cathodes.

6. The combination according to claim 3, said positive electrode comprising a porous plate cathode, said negative electrode comprising a zinc-containing anode, said electrolyte containing from 10 percent to about 40 percent of an alkali metal hydroxide, said dendrite-inhibiting agent being present in said electrolyte in an amount from 0.1 percent up to a maximum of about 10 percent and not exceeding the limit of its solubility in said electrolyte.

7. The combination according to claim 2, said negative electrode comprising a pasted-type anode including a current collector, a cohesive body of finely divided rechargeable active zinc-containing material, said dendrite-inhibiting agent being incorporated as a binder in said cohesive body in an amount from about 0.1 to 10.0 percent by weight, based on the quantity of zinc in said negative electrode.

8. The combination according to claim 1, said positive ion of said organic cationic polymer being monovalent diallyldimethylammonium.

9. The combination according to claim 8, said positive ion having associated therewith a hydroxyl anion.

10. The combination according to claim 4, said positive electrode containing zinc, said aqueous liquid containing zinc ions, and said additive dendrite-inhibiting agent being present in said liquid in an amount of from 0.1 percent to 10 percent by weight of said liquid.

11. The combination according to claim 2, said rechargeable cell having an ionically permeable membrane between said positive and negative electrodes, said dendrite-inhibiting agent in said liquid being present as a coating on said membrane and adapted to be dissolved in said aqueous liquid.

12. In combination with opposed positive and negative electrodes immersed in an aqueous liquid wherein one of the electrodes contains zinc, an additive zinc dendrite-inhibiting agent in said liquid consisting essentially of an organic cationic polymer having a homopolymeric molecular chain of repeating units which in aqueous solution forms positive ions of a formula selected from the group consisting of:

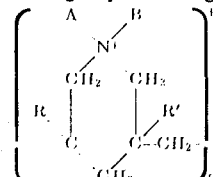

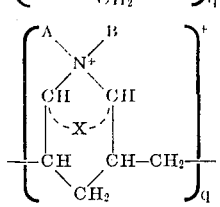

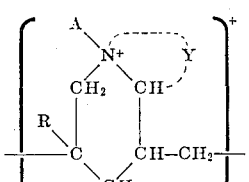

and

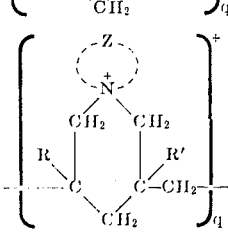

wherein
  A and B independently represent a member selected from the class consisting of hydrogen, alkyl and phenyl radicals on which radicals any substituents are selected from the group consisting of hydroxy, amido, carboloweralkoxy, loweralkoxy, phenoxy, naphthoxy, cyano, thioloweralkoxy, thiophenoxy, loweralkoyl, 5- and 6- membered cycloalkyl, tri-(loweralkyl) ammoniumloweralkyl, with, on the alkyl groupings only, a nitro group, and, on the phenyl radicals only, a halogen atom; and
  R and R' independently represent a member selected from the class consisting of hydrogen, chloro, bromo, loweralkyl, and phenyl radicals;
  X represents a divalent radical of the formula:
    $-CH_2-(O)_n-(CH_2)_m-$
  Y represents a divalent radical of the formula: $-(CH_2)_p-(O)_n-CH_2-$
  Z represents a divalent radical of the formula: $-(CH_2)_p-(O)_n-(CH_2)_2-$
and $n$ is one of the numbers 0 and 1;
$m$ is one of the numbers 1 and 2;
$p$ is one of the numbers 2 and 3;
and
$q$ is an integer representing the number of units in the molecular chain.

* * * * *